Figure 1:
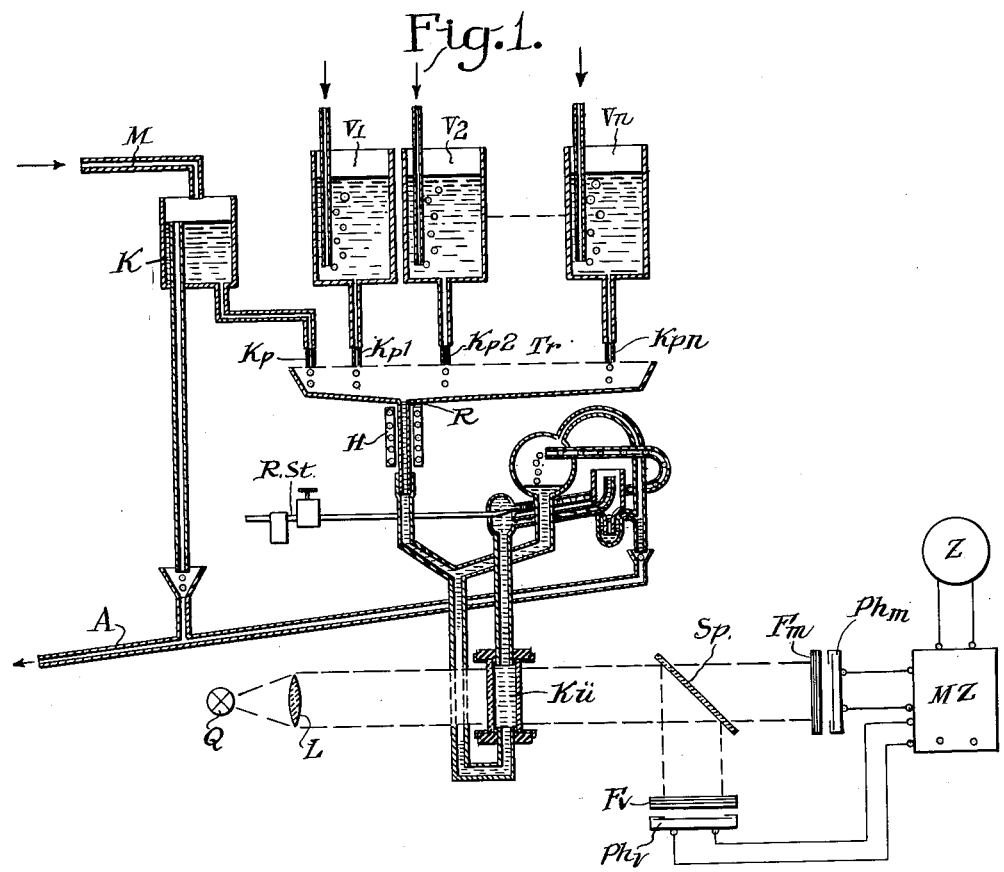

April 18, 1961     O. PETERSEN     2,980,512
CONTINUOUSLY WORKING PLANT COLORIMETER
Filed March 27, 1959     2 Sheets-Sheet 1

INVENTOR
*OTTO PETERSEN*

BY *Connolly and Hutz*

ATTORNEYS

2,980,512
CONTINUOUSLY WORKING PLANT COLORIMETER

Otto Petersen, Krefeld, Germany, assignor to Farbenfabriken Bayer Aktiengesellschaft, Leverkusen, Germany, a corporation of Germany Filed Mar. 27, 1959, Ser. No. 802,451

Claims priority, application Germany Mar. 28, 1958

2 Claims. (Cl. 23—253)

It is known to measure photometrically the content of light-absorbing, i.e. coloured, constituents of liquids or gases with the aid of a plant colorimeter in a continuous way.

Even in cases where the constituent to be measured is colourless it is frequently possible to obtain photoelectric readings for its concentration provided such a constituent gives a coloration with added chemicals and the extinction of the medium thus coloured is in an unequivocal relation to the concentration of the previously colourless constituent to be measured.

Discontinuous working arrangements are known for these measurements which possess suitable volume-dosing devices for the measuring and auxiliary liquids operating in accordance with a pre-determined cycle. The auxiliary liquids are, in general, stored in storage tanks housed in the apparatus. A contact arrangement operated by a synchronous motor controls the opening and shutting of cocks or small valves so that the media involved, for example solutions, fill the measuring volumes. After further operation the measuring volumes are discharged into a reaction vessel which is connected with a flowing-through measuring cell. A partial current of the colourless measuring medium is conducted at the same time through a comparison cell. The pure coloration is then indicated or recorded with the aid of suitable light filters in a measuring or comparison path of rays as the differential reading. In accordance with the intended application, it is possible in this way to carry out 5 to 15 analyses per hour.

These discontinuous working arrangements possess however, considerable short-comings:

Unsatisfactory working of the dosing arrangements, for example, jamming of the small valves, interferes completely with the measurements.

Soiling of the windows of the cell leads to a diminished sensitivity.

Differing heavy soiling of the windows of the measuring and comparison cell causes shifting of the zero position.

An analysis number of 5–15 per hour is frequently an insufficient indication, especially if rapid changes are to be detected.

The present invention relates to a continuously working plant colorimeter which obviates the said shortcomings. It comprises a receiver, for example, a hopper which receives a constant partial current of the liquid whose content of colourless constituent is to be measured quantitatively as well as possibly several currents of liquid reagents to bring about a coloration. These liquid currents are united into a single current and the latter are delivered to a reaction path the length of which is adapted to each and every reaction time (in special cases a coil), the former being heatable, if desired, so as to initiate or promote the reaction. The currents end in a measuring cell having an additional arrangement in which the current of liquid is circulated by an auxiliary gas. The cell is provided with a discharge funnel for carrying away the current of liquid, a light-source arrangement sending a parallel beam of light through the measuring cell, a semi-permeable mirror inserted in the path of rays at an angle of 45° at the side of the cell opposed to that of the light-source, a measuring filter inserted behind the mirror in the straight-line path of rays before a measuring photocell, a comparison filter inserted in the path of rays reflected by the mirror before a comparison photocell, and a measuring device. The latter receiving the currents supplied by the two photocells and effects a differential or, better, a quotient from the currents, and also indicates or records the result.

Instead of the semi-permeable mirror there may also be provided a light variation arrangement which alternately inserts the two light filters in the path of rays by means of a rotating disk. The measuring device has then to effect the differential or quotient formation of the intermittent, possibly amplified re-inforced currents.

As an example of the useful application of the arrangement according to the invention frequently met in practice, there will be described with the aid of the accompanying drawings the recording measurement of the residual hardness of boiler feed water for the control of an ion exchanger plant.

Figure 2:
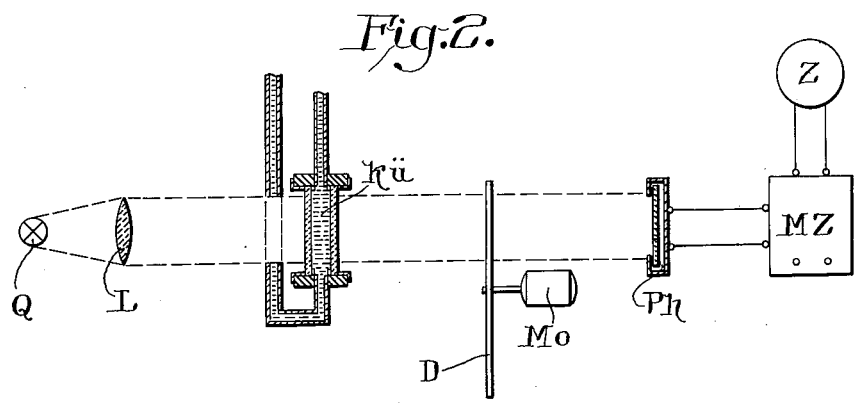
Figure 3:
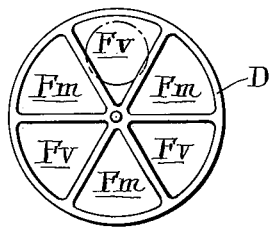

According to the drawing, Fig. 1 is a view partially in section of one embodiment of the present invention;

Fig. 2 is a view partially in section of another embodiment of the invention; and Fig. 3 is a view of the filter disc used in Fig. 2.

The water M to be tested as to its residual hardness flows through the constant head vessel K provided with an overflow into the discharge funnel of the pipe line A. A constant quantity reaches the collecting funnel $Tr$ via the capillary $Kp$. From $V_1$, a so-called plexochrome solution drops through $K_1$, from $V_2$ a zinc buffer solution through the capillary $Kp_2$, from $V_n$ (in this case $V_3$) a solution of chromogen black through $Kp_n$. The dropping speeds of all media are constant due to the constant pressure head and to the Mariotte immersion tubes in $V_1$, $V_2$, $V_n$ in a uniformly tempered casing. The reaction time is in this case extremely short so that the reaction path R can, therefore, be a glass tube of only a few centimetres. A heater H is unnecessary in this case.

The current of the liquid then reaches the cell $Ku$ having a layer thickness of about 10 cm. The liquid is constantly circulated from the system via a reducing station RST with the aid of an auxiliary gas, for example nitrogen, or in the present case by compressed air (air lift pump). The excess flows through a discharge funnel into the discharge pipe A.

A small electric bulb of six volts and two amps with a condenser lens L serves as light source Q. The parallel light passes through the cell $Ku$ and impinges upon the semipermeable mirror $Sp$. Part of the light illuminates the measuring photocell $Ph_m$ through the measuring filter $F_M$, the other part of the light is reflected and illuminates the cell $Ph_V$ (photoelement) through the comparison filter $F_V$. The maximum permeability of the filter $F_M$ lies in the wave length range of maximum absorption of the coloured solution, that of the filter $F_V$ in the range of minimum absorption, in the present case with an absorption O.

The currents supplied by the photocells or photoelements are led to the indicating or recording instrument Z via the measuring device MZ. If a differential or quotient amplification of the currents of the photoelements is carried out in the measuring device an optimum measuring sensitivity of 0–0.1° DH can be attained. The operating time amounts to a few seconds only. DH is the measure of water hardness. For example, 1°

English hardness gauge equals 1 grain $CaCO_3$ in 1 gallon water.

In the embodiment shown in Figs. 2 and 3 described above Q represents the light source, L a condenser lens, K$u$ the cell and P$h$ is a single photo element. MZ is the measuring auxiliary and Z is the indicator or registering instrument. F$m$ and F$v$ are two filters now, however, fitted on a rotating disc D in an interchanging sequence. The disc D is driven by the motor M$o$.

Further examples of application are:

The continuous determination of the silicic acid and phosphate content in boiler feed water, recording of iron traces in aqueous solutions and the measurement of chlorine traces in gases, an aqueous auxiliary medium (measuring liquid M) being previously treated with the gas.

I claim:

1. A continuously working plant colorimeter comprising a collector which receives a constant partial current of the liquid whose content of colorless constituent is to be measured quantitatively as well as currents of liquid reagents required to bring out a coloration, a measurement cell, means connected with the collector and the measurement cell for uniting the currents into a single current and for delivering the latter to said cell, the length of said means being adapted to each and every reaction time, additional means connected with said cell by which the current of liquid is circulated, a discharge funnel connected with the cell for carrying away a portion of the current of liquid, means for cycling the remaining portion of the current with fresh liquid entering the cell, a lighting means located adjacent the cell for sending a parallel beam of light through the cell, a semipermeable mirror inserted in the path of rays under an angle of 45° at the side of the cell opposite to that of the lighting means, a measuring filter inserted behind the mirror in the straight-lined path of rays, a measuring photocell supported immediately behind said measuring filter, a comparison filter inserted in the path of rays reflected by the mirror, a comparison photocell supported behind the comparison filter and a measuring device which receives the currents supplied by the two photocells, evaluates them and indicates the result.

2. A plant colorimeter according to claim 1, the semipermeable mirror is replaced by a light variation means which alternately brings the two light filters in the path of rays with the aid of rotating disc, said measuring device evaluating the intermittent currents.

References Cited in the file of this patent

UNITED STATES PATENTS

| 1,746,525 | Darrah | Feb. 11, 1930 |

FOREIGN PATENTS

| 117,995 | Sweden | Jan. 21, 1947 |

OTHER REFERENCES

Norris Electronics, vol. 28, pages 140–142, July 1955.